United States Patent
Shuster et al.

(10) Patent No.: US 11,132,293 B2
(45) Date of Patent: Sep. 28, 2021

(54) INTELLIGENT GARBAGE COLLECTOR FOR CONTAINERS

(71) Applicant: Red Hat Israel, Ltd., Raanana (IL)

(72) Inventors: Boaz Shuster, Kefar Saba (IL); Oded Ramraz, Wellesley, MA (US)

(73) Assignee: RED HAT ISRAEL, LTD., Raanana (IL)

( * ) Notice: Subject to any disclaimer, the term of this patent is extended or adjusted under 35 U.S.C. 154(b) by 248 days.

(21) Appl. No.: 15/949,817

(22) Filed: Apr. 10, 2018

(65) Prior Publication Data

US 2019/0310935 A1    Oct. 10, 2019

(51) Int. Cl.
| G06F 21/00 | (2013.01) |
| G06F 12/02 | (2006.01) |
| G06F 21/56 | (2013.01) |
| G06N 20/00 | (2019.01) |
| G06F 16/28 | (2019.01) |

(52) U.S. Cl.
CPC ........ G06F 12/0253 (2013.01); G06F 16/285 (2019.01); G06F 21/566 (2013.01); G06N 20/00 (2019.01); *G06F 2212/1041* (2013.01); *G06F 2212/1052* (2013.01); *G06F 2221/034* (2013.01)

(58) Field of Classification Search
CPC .......................... G06F 12/0253; G06F 21/566
See application file for complete search history.

(56) References Cited

U.S. PATENT DOCUMENTS

| 6,138,127 A * | 10/2000 | Pasch ................. G06F 12/0253 |
| 9,256,467 B1 | 2/2016 | Singh et al. |
| 9,785,643 B1 | 10/2017 | Patil et al. |
| 10,108,475 B2 * | 10/2018 | Chikabelapur ....... G06F 11/079 |
| 2004/0158589 A1 * | 8/2004 | Liang .................. G06F 11/3466 |
| 2016/0098229 A1 * | 4/2016 | Schreiber .............. G06F 3/0608 |
| | | 711/166 |

(Continued)

FOREIGN PATENT DOCUMENTS

CN         105740048 A      7/2016

OTHER PUBLICATIONS

Xu et al., "Precise Memory Leak Detection for Java Software Using Container Profiling", ACM Trans. Softw. Eng. Methodol. 22, 3, Article 17 (Jul. 2013), 28 pages (Year: 2013).*

(Continued)

*Primary Examiner* — Chau Le
(74) *Attorney, Agent, or Firm* — Haynes and Boone, LLP

(57) ABSTRACT

Methods, systems, and computer program products are included for the intelligent garbage collection of containers. An example method includes providing a garbage collection data structure, the garbage collection data structure including metadata and one or more resource consumption parameters corresponding to the container. The one or more resource consumption parameters are analyzed by a machine-learning function. Based on the analyzing, the container is classified into one or more classes, the one or more classes including at least one of a suspicious container class, a malicious container class, or a normal container class. Based on the classifying, one or more garbage collection actions are performed on the container, including at least one of generating an alert corresponding to the container or reducing the resource consumption of the container.

20 Claims, 5 Drawing Sheets

(56) References Cited

U.S. PATENT DOCUMENTS

| | | | |
|---|---|---|---|
| 2016/0116303 A1* | 4/2016 | Rose | G06F 3/0484 |
| | | | 702/188 |
| 2016/0283261 A1* | 9/2016 | Nakatsu | G06F 9/4558 |
| 2017/0153930 A1 | 6/2017 | Philips et al. | |
| 2017/0177877 A1 | 6/2017 | Suarez et al. | |
| 2018/0336351 A1* | 11/2018 | Jeffries | G06F 21/566 |
| 2019/0095323 A1* | 3/2019 | Gidra | G06F 12/0269 |

OTHER PUBLICATIONS

Rafael Benevides, "Java inside docker: What you must know to not FAIL", Retrieved From https://developers.redhat.com/blog/2017/03/14/java-inside-docker/, Published Mar. 14, 2017. (Year: 2017).*

"Prune unused Docker objects", https://docs.docker.com/config/pruning/, Accessed Apr. 9, 2018, 5 pgs.

"Configuring kubelet Garbage Collection", https://kubernetes.io/docs/concepts/cluster-administration/kubelet-garbage-collection/, Accessed Apr. 9, 2018, 5 pgs.

* cited by examiner

| Garbage Collection Data Structure 306 ||||||
| --- | --- | --- | --- | --- | --- |
| Name 322 | ID 324 | CPU_AVG 326 | Memory 328 | Duration 330 | Class 332 |
| fishy/busybox:2.7 | 5b0d590ab729 | 54 | 340 | 54238 | suspicious |
| fishy/busybox:2.7 | 5b0d590ab729 | 198 | 64532 | 8371 | malicious |
| nginx:5 | e548f1a579cf | 1.0 | 0.5 | 575 | normal |
| httpd:2.7 | 01154c38b473 | 1.0 | 0.5 | 412 | normal |
| busybox:2.7 | 5b0d59026729 | 30.0 | 12.1 | 3232 | suspicious |
| busybox:2.7 | 5b0d59026729 | 30.0 | 125 | 8908 | normal |
| busybox:2.7 | 5b0d59026729 | 10.0 | 29.0 | 6489 | normal |
| fedora:26 | B0b140824a48 | 50 | 5032 | 6253 | suspicious |
| fedora:25 | 9cffd21a45e3 | 25 | 30011 | 1123 | suspicious |
| jenkins/jenkins:lts | | 83 | 600 | 33 | normal |
| glance.io/cryptocoin | e739857d5c0f | 140 | 472 | 5439 | malicious |

FIG. 3

INTELLIGENT GARBAGE COLLECTOR FOR CONTAINERS

FIELD OF DISCLOSURE

The present disclosure generally relates to data processing, database and file management or data structures, and more particularly to optimizing data storage of containers using an intelligent garbage collector.

BACKGROUND

Containers are lightweight mechanisms for isolating running processes so that they are limited to interacting only with their designated resources. Many application instances can be running in containers on a single host without visibility into one another's processes, files, network, and so on. Typically, each container provides a single service (often called a "micro-service"), such as a web server or a database, though containers can be used for arbitrary workloads.

Containers may be used to ensure consistency across multiple development environments. For example, software applications may be packaged into containers that include collections of objects and metadata. An image is a binary file that includes all of the requirements for running a container, as well as metadata describing its needs and capabilities. Images, which may be read-only, may contain files such as packages, scripts, libraries, settings, etc. These files allow the image to be run as a standalone application in a container.

SUMMARY

A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for performing garbage collection including: providing a garbage collection data structure, the garbage collection data structure including metadata corresponding to a container and one or more resource consumption parameters corresponding to the container; analyzing, by a machine-learning function, the one or more resource consumption parameters; classifying, based on the analyzing, the container into one or more classes, the one or more classes including at least one of a suspicious container class, a malicious container class, or a normal container class. The method also includes performing one or more garbage collection actions on the container, including at least one of generating an alert corresponding to the container, reducing the resource consumption of the container, or taking no action corresponding to the container.

One general aspect includes a non-transitory machine-readable medium having stored thereon machine-readable instructions executable to cause at least one machine to perform operations including: providing a garbage collection data structure, the garbage collection data structure including metadata corresponding to a container and one or more resource consumption parameters corresponding to the container; analyzing, by a machine-learning function, the one or more resource consumption parameters; classifying, based on the analyzing, the container into one or more classes, the one or more classes including at least one of a suspicious container class, a malicious container class, or a normal container class. The non-transitory machine-readable medium also includes performing one or more garbage collection actions on the container, including at least one of generating an alert corresponding to the container, reducing the resource consumption of the container, or taking no action corresponding to the container. Other examples of this aspect include corresponding computer systems, apparatus, and computer programs recorded on one or more computer storage devices, each configured to perform the actions of the methods.

One general aspect includes a system. The system includes a non-transitory memory including instructions and one or more hardware processors coupled to the non-transitory memory to execute instructions from the non-transitory memory to perform operations. The operations include: providing a garbage collection data structure, the garbage collection data structure including metadata corresponding to a container and one or more resource consumption parameters corresponding to the container. The system also includes analyzing, by a machine-learning function, the one or more resource consumption parameters. The system also includes classifying, based on the analyzing, the container into one or more classes, the one or more classes including at least one of a suspicious container class, a malicious container class, or a normal container class. The system also includes performing one or more garbage collection actions on the container, including at least one of generating an alert corresponding to the container, reducing the resource consumption of the container, or taking no action corresponding to the container. Other examples of this aspect include corresponding computer systems, apparatus, and computer programs recorded on one or more computer storage devices, each configured to perform the actions of the methods.

BRIEF DESCRIPTION OF THE DRAWINGS

FIG. 3 is a diagrammatic representation of a garbage collection data structure for the intelligent garbage collection of containers, in accordance with various examples of the present disclosure.

Figure 1:
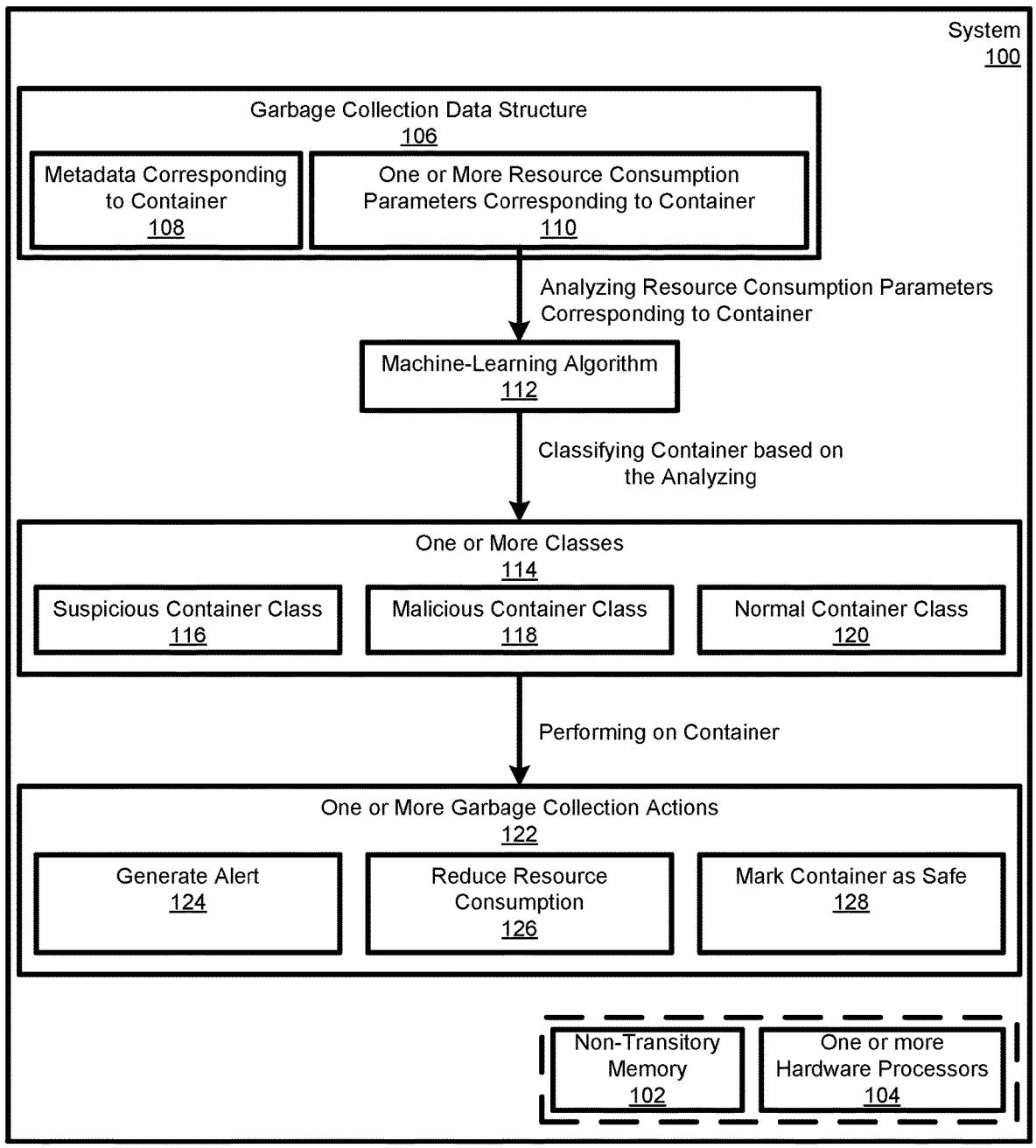
FIG. 1 is an organizational diagram illustrating a system for the intelligent garbage collection of containers, in accordance with various examples of the present disclosure.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Containerized services and applications have become exceedingly popular within the last decade, and the accompanying surge in demand for container storage has put a strain on existing storage infrastructure. For example, it may be desirable to deploy container services across numerous nodes by replicating the service as a container on each node. Such replication, while serving a useful purpose, consumes a large amount of storage space, and may eventually cause the physical host hosting the nodes to run out of storage space.

One solution is to simply increase the amount of host storage space. However, such expansion is often unsustainable—no sooner after a cluster of servers is added is another demanded. Thus, at some point, the physical constraints to expansion (e.g., availability of land, rising energy costs, and network topology limits) compel the pursuit of alternative solutions. A better and more economical solution is to increase the efficiency of container storage, for example by intelligently removing unused or unwanted containers ("garbage").

Various examples described herein provide techniques for intelligently collecting and removing such garbage. As a high-level overview, the techniques include collecting information about the container in a garbage collection data structure such as a database, table or a comma-separated values (.csv) file. In some examples, metadata such as container name and identifier are collected. Container resource utilization information may also be collected. The information may then be analyzed by a machine-learning function, such as a decision tree function. The function classifies the container or container into one or more classes, such as a suspicious container class, a malicious container class, and/or a normal container class. Garbage collection actions such as generating alerts or forced termination may then performed on the container. For example, alerts may be generated for containers in the suspicious container class, while containers in the malicious container class may be deleted or be forced to terminate. On the other hand, no adverse actions may be enforced against containers in the normal container class. Instead, the function or the system may mark the containers in the normal container class as "safe." In some examples, the marking may, for example, be a system flag that is not displayed in the data structure. In some examples, the marking may be the classification itself, i.e., "normal." In some examples, the marking may be a visual indicator, such as a check mark, a symbol, a color, etc.

In more detail regarding the classification performed by the machine-learning function, the function may, for example, construct a decision tree using attributes or predictors adopted from the computer resource consumption parameters. In some examples, the attributes used include container processor load, container memory consumption, container uptime or duration, etc. The function may also consider metadata corresponding to the container, such as the container or container image's name and the container or container image's identifier to classify the images.

The function may determine appropriate cut-offs to discretize the attributes. For example, a processor load of 50% or more may be considered high, while a processor load of less than 50% may be considered low. Additionally, the function may consider more than one attribute in its analysis, in which case the function may need to determine an ordering of the attributes to apply as the root node, the first decision node, the second decision node, etc. For this, selection criterion such as a gini index, information gain, etc., may be used. In some examples, the attribute with the highest information gain or lowest gini index is determined to be the root node; the second highest information gain or second lowest gini index is determined to be the first decision node, so on and so forth.

The function may decide when to stop its analysis. In some examples, the function may stop its analysis after a target prediction accuracy rate is reached, or after some measure of diminishing returns is achieved. In some examples, the function may keep building branches or decision nodes until the error rate in a test set is optimized. The optimal error rate may be determined to be the point where neither adding more nodes to the analysis nor reducing the number of nodes results in more accurate predictions. This may occur, for example, when the function begins to factor in too many outliers and other irregularities into the prediction model. Thus, the function may build an additional node, and compare the predictive capabilities of the model including the new node with the model not including the new node to determine the effects of the addition. If the additional node results in greater inaccuracy in the model, then the function discards the additional node from the model and continues to apply the old model.

In addition, the function may be self-learning. As new data is added to the garbage collection data structure or is updated, the function may refine its analysis by recalculating its selection criterion and building a new prediction model.

By intelligently classifying containers using a machine-learning function and performing garbage collection actions on containers, these techniques improve the functioning of computing systems by, for example, reducing the amount of space required to store containers. These techniques also alert a user to the presence of suspicious or malicious containers or containerized software running on his or her computer which he or she might not otherwise have been aware of. Removing such suspicious or malicious containers not only safeguards a user's against exploitation, but also improves the computer's performance.

FIG. 1 is an organizational diagram illustrating a system 100 for the intelligent garbage collection of containers, in accordance with various examples of the present disclosure.

The system 100 includes a non-transitory memory 102 and one or more hardware processors 104. The non-transitory memory 102 may be structured to include at least one computer-readable storage medium on which is stored one or more sets of instructions (e.g., software) including any one or more of the methodologies or functions described herein. The non-transitory memory 102 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory machine-readable medium that are executable by the processor.

The one or more hardware processors 104 may be structured to include one or more general-purpose processing devices such as a microprocessor, central processing unit (CPU), and the like. More particularly, the processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor is structured to include one or more special-purpose processing devices such as an application specific integrated circuit (ASIC), a field programmable gate array (FPGA), a digital signal processor (DSP), network processor, and so forth. The processor executes instructions for performing the operations, steps, and actions discussed herein.

In some examples, the system 100 includes a bus or other communication mechanism for communicating information data, signals, and information between the non-transitory memory 102, the one or more hardware processors 104, and the various components of system 100. For example, the various components may include a data storage device, which may be local to the system 100 or communicatively coupled to the system 100 via a network interface. Components may further include input/output (I/O) components such as a keyboard, mouse, touch interface, and/or a camera that process user actions such as key presses, clicks, taps, gestures, etc., and which send a corresponding signal to the bus or other communication mechanism. The I/O components may also include an output component such as a display.

In some examples, a user may use the I/O component such as a mouse or a keyboard to command the system 100, via a user interface such as a graphical user interface, a command line interface, or any other user interface, to begin garbage collection using the garbage collection data structure 106. The garbage collection data structure 106 may be any type of data structure, including a database, a table, a comma-separated values (.csv) file. Included in the data structure 106 may be metadata 108 corresponding to a container and one or more resource consumption parameters 110 corresponding to the container. For example, as shown in FIG. 3, the data structure may be in the form of a table and include metadata such as a name and an identifier of a container. The data structure may also include one or more resource consumption parameters 110, such as an indication of processor load (e.g., average processor utilization CPU_AVG), an amount of memory consumed by the container (e.g., minimum, maximum, and average memory consumed), and a running duration or uptime of the container (e.g., total uptime, uptime in past week, etc.).

Figure 4:
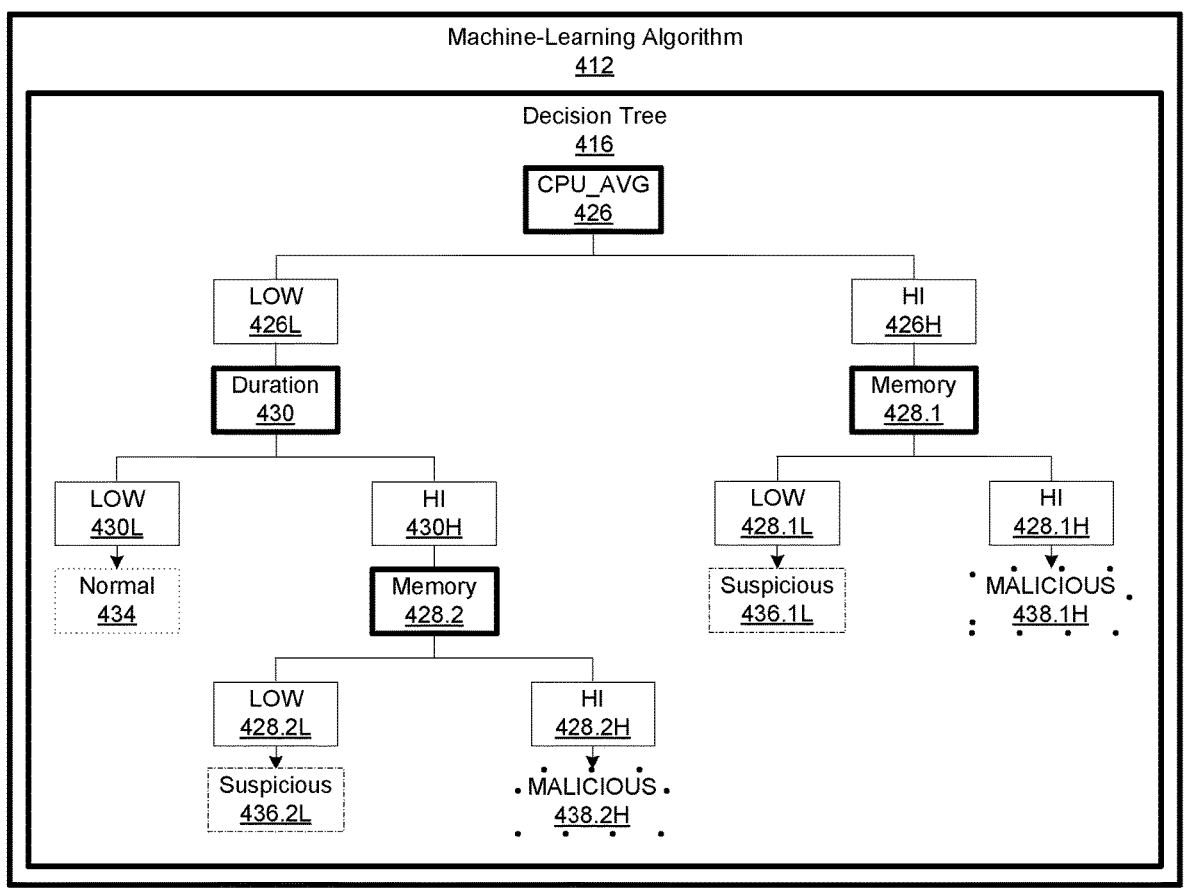
FIG. 4 is an organization diagram illustrating a machine-learning function and a decision tree for the intelligent garbage collection of containers, in accordance with various examples of the present disclosure.

A machine-learning function 112 uses the information in the garbage collection data structure 106, such as the metadata 108 and/or the one or more resource consumption parameters 110 corresponding to a container to classify the corresponding container. As earlier described, the machine-learning function 112 may be a decision tree function. Other functions such as random forest, support vector machine, K nearest neighbor, etc., may be used to perform the classification. The function may include a method to select its attributes, root nodes, decision nodes, etc., using selection criteria such as information gain and gini index earlier described. As exemplified in FIG. 4 showing a decision tree, a root node of the decision tree may be the resource consumption parameter CPU_AVG, while other resource consumption parameters, such as duration and memory in FIG. 4, may be selected as the decision nodes.

Using the decision tree, a container may be classified into one or more classes 114. The one or more classes 114 may include a suspicious container class 116, a malicious container class 118, and a normal container class 120. While the phrase "container class" is used here (and earlier, "container" and "container images" are used) such words and phrases are not intended to be limiting and thus may also refer more broadly to containers, container images, containerized services, container applications, and other containerized software, programs or processes without departing from the spirit of the invention.

The system 100 may perform one or more garbage collection actions 122. For example, the system 100 may generate an alert 124 for containers in the suspicious container class 116. The alert 124 may include a message displayed on an interface such as a command line interface or a graphical user interface. The alert 124 may also include creating and/or updating a status field in the data structure 106 and indicating the reason for the alert. For example, an alert 124 may be generated for a container which has been running for an exceedingly long time but which consumes a small amount of memory and imposes a low load on the CPU. Additionally, the function 112 may analyze the name and identifier of the container to ensure that the container is legitimate. The function 112 may also seek user verification, for example, by requiring a positive or negative indication as to the legitimacy of the container. The user may, for example, enter such an indication through the user interface, such as by typing a key letter, word, or phrase in a verification field of the data structure 106 or by checking a box in a graphical user interface. The user may also respond in bulk by, for example, uploading a file, setting a policy, etc.

Another possible garbage collection action 122 is an action to reduce resource consumption 126. In some examples, the reduction may be achieved by preventing the execution of a container, pausing the container, terminating the container (if it has already executed), and/or deleting the container. The user may train or feed the function 112 by manually performing the appropriate garbage collection action 122 and recording the action 122 in the data structure 106. The user may also feed the function 112 with training data sets procured from other data structures, for example to improve prediction accuracy or increase the speed at which the function 112 may be trained.

After feeding the function 112 a sufficient quantity of data and training the function 112, the function 112 may be able to accurately predict (e.g., using the decision tree model) the action 122 that a user would have taken if the user had manually reviewed the container data in the data structure 106. As an example, the function 112 may classify a container into the malicious container class 118 if the container imposes a high average load on the one or more hardware processors 104, consumes a large amount of the non-transitory memory 102, and has been running for a long duration.

However, before acting on the malicious container, which may include termination or deletion, the function 112 may analyze the metadata of the malicious container. In some examples, the function 112 may compare the metadata and resource consumption parameters of the supposedly malicious container with corresponding information from external sources (i.e., not data structure 106) to determine if the supposedly malicious container is truly malicious. For example, the function 112 may consult the internet for a "blacklist" data structure listing the names and identifiers of containers known to be malicious, or a "whitelist" data structure of containers known not to be malicious. The function 112 may also lookup a local storage device or local network for more information about the supposedly malicious container, such as its installation history, the files and objects run by the container, and use of network resources by the container.

In some examples, the function 112 may mark the container as safe 128 if the function 112 classifies a container as a normal container and places the container in the normal container class 120, or if the function 112 determines that the container is on a whitelist. In some examples, the function 112 may still generate an alert 124 for suspicious or malicious containers even though the containers are whitelisted, if for example, the container's resource consumption patterns seem suspect or malicious. In some examples, the function's 112 sensitivity to performing or recommending the one or more actions 122 is initially determined by a programmable policy. The policy may initially be set to generate an alert 124 for all containers in suspicious container class 116 and malicious container class 118, but may be updated dynamically by function 112 as a result of training. The updates may be logged so that a user may be able to review the changes. The user may also make changes manually to the policy.

Figure 2:
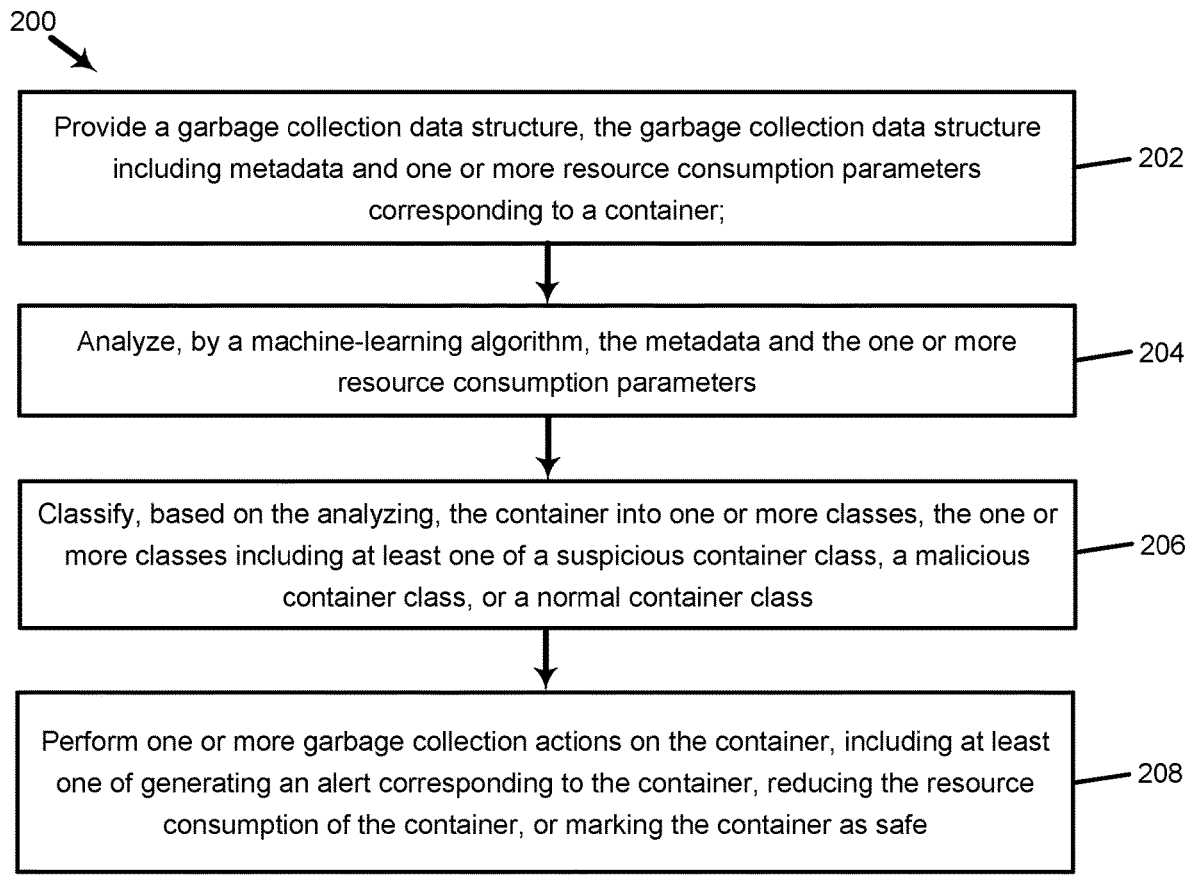
FIG. 2 is a flow diagram illustrating a method for the intelligent garbage collection of containers, in accordance with various examples of the present disclosure.

FIG. 2 is a flow diagram of a method 200 for the intelligent garbage collection of containers, in accordance with various examples of the present disclosure. In some examples, the method is performed by executing computer-readable instructions that are stored in a non-transitory memory using one or more processors. The non-transitory memory and processors may be provided by, for example, the hardware described with respect to FIG. 1. The method 200 may be performed by the one or more hardware processors 104 that are described in further detail with respect to FIG. 1. Additional steps may be provided before, during, and after the steps of method 200, and some of the steps described may be replaced, eliminated and/or re-ordered for other examples of the method 200. For example, prior to the steps of method 200, a user may train a garbage collection function. Method 200 may also include additional steps, such as performing a second analysis using a second machine-learning function to determine which garbage collection action to perform. The second machine-learning function may be the same as the first or may be a different function which takes into account the classes that have been created to predict the appropriate garbage collection action to take. Method 200 may also be performed, for example, in combination with the steps of method 500 described with respect to FIG. 5. Method 200 may also be performed using a garbage collection data structure 306 described with respect to FIG. 3. Method 200 may also be performed using a machine-learning function 412 described with respect to FIG. 4. In some examples, method 200 may be performed by one or more systems 100 described with respect to FIG. 1, acting in concert or individually.

At action 202, a garbage collection data structure is provided to the system. The garbage collection data structure may be created by the user or may be retrieved from a local or remote source, such as a local storage device or an Internet website. The garbage collection data structure may be in the form of rows and columns, and include information such as metadata and one or more resource consumption parameters corresponding to one or more containers.

At action 204, a machine-learning function analyzes the one or more resource consumption parameters. Like earlier described, the machine-learning function may be trained prior to the analysis. Referring to FIG. 3, the one or more resource consumption parameters may include an average amount of computer processing power and memory consumed by the container (CPU_AVG 326 and memory 328), and a running duration or uptime of the container (duration 330). The machine-learning function may also analyze the container's metadata, such as the container's name 322 and the container's identifier 324.

The analysis may include a discretization of data into classes using one or a combination of machine-learning functions, such as support vector machine, k nearest neighbors, etc. For example, as opposed to simply classifying processor consumption as below 50% or more than or equal to 50%, discretization using k nearest neighbors may yield three seemingly random classes: below 23%, between 23% and 46%, and above 46%. These processor consumption classes may be used in a decision tree, as opposed to the simple low/high classes shown in FIG. 4.

The analysis may also include a determination of the type or types of machine-learning function or functions to apply to a data structure (e.g., one or a combination of a decision tree, support vector machine, k nearest neighbors, etc.), a selection (from the data structure) of the specific attributes, vectors, or other types of input to be used in the machine-learning function(s), and an order in which the inputs should be used in the function(s). As earlier described, the function may use selection criteria such as information gain and/or a gini index to determine the input or attribute to be selected as the root node and the input to be selected as the decision nodes.

Where more than one machine-learning function may be applied, the analysis may include determining the function(s) to apply to produce the most accurate predictions. One way such a determination may be made may include conducting test runs using the classes generated by different functions (e.g., decision tree vs. k nearest neighbors vs. support vector machine) or by different combinations of functions (e.g., combining decision tree with k nearest neighbors vs. combining decision tree with support vector machine). For example, one function may discretize memory utilization to two classes, while another may discretize to eight classes. It may not be immediately apparent that the more nuanced discretization would yield more accurate predictions, and thus the analysis may continue with performing test runs to compare the results of the decision tree function in a two-class discretization versus an eight-class discretization. In some examples, the analysis may conclude with the system choosing the function or combination of functions that yield the best test run results. In some examples, a test run is not performed. Instead, the determination as to which functions to use to generate the most appropriate classes may be made based on an analysis of the particular characteristics of the data, such as the size of the margin separating the classes, presence of data clusters, randomness of the data, etc.

At action 206, the container is classified, based on the analyzing, into one or more classes. In some examples, the classification at action 206 is included as part of or as an output of the analysis performed by the machine learning function at action 204. The resulting one or more classes may, for example, be a suspicious container class, a malicious container class, or a normal container class. In some examples, more classes may be included, such as a quarantine container class, a verified container class, etc. One or more of the classes may be empty and include no containers, while others may include one or more containers.

As with determining the number of discrete classes into which to classify the input data for the machine-learning function (e.g., as described in action 204), the number of classes (e.g., suspicious, malicious, normal, etc.) into which to classify the containers may be determined by the function using methods like those described, for example, with respect to action 204. In some examples, the range of container classes is constrained by the range of pre-existing classes. For example, if a user has only ever classified containers as suspicious, malicious, or normal, then the function may also do the same. However, in some examples, the function may determine that a new classification is required, such as when the container does not fall neatly into any pre-existing class, or when a new cluster of containers having similar characteristics appears in the data structure. The function may create a new class automatically or suggest to the user that a new class be created. The new class may have a generic name such as "new class," which a user may subsequently rename.

At action 208, one or more garbage collection actions are performed on a container. The actions may, as earlier described, include generating an alert corresponding to the container, reducing the resource consumption of the container, or taking no action on the container. The performed action may, like the classification of action 206, be an output of the machine learning function after its analysis at action 204. Thus, a first function may provide a first or intermediate output, i.e., the classification, and a second function (which may be the same as the first) may provide a second or final output, i.e., the performed action.

FIG. 3 is an example of a garbage collection data structure 306 for the intelligent garbage collection of containers, in accordance with various examples of the present disclosure.

As shown in FIG. 3, the data structure 306 may be a table arranged into rows and columns. Alternatively, the data structure 306 may also be in the form of a database, a .csv file, a list, a tree, a binary tree, a heap, an array, of primitive or non-primitive types, of a composite type, etc. The data structure 306 may include a header row with fields corresponding to a container. Thus, the header row fields may include metadata describing the container, such as the names 322 and the identifiers (ID's) 324 of the container. The header row may also include fields for the container's resource consumption parameters, such as average computer processor utilization or CPU_AVG 326, memory consumption or memory 328, and duration 330. The data structure 306 may also include a class 332. In some examples, the data structure 306 may include more or less fields.

While two types of metadata are shown, name 322 and ID 324, more types of metadata may be included in the data structure 306, including a last accessed date, a last modified date, file size, file path, etc. The ID 324 may be a unique identifier such as a hash generated by a hashing algorithm such as MD5. ID 324, especially if in full hash form, may be too long to fit in a field of a data structure 306. In some examples, name 322 and ID 324 may be truncated. In some examples, the container may have a name 322 but not an ID 324 (e.g., in FIG. 3, the container jenkins/jenkins: Its has a name but no identifier). In some examples, duration 330 is considered metadata.

CPU_AVG 326 and memory 328 are examples of computer resource consumption parameters which may be included in the data structure 306. Other measures of resource consumption corresponding to a container include: storage space consumed, number of processor threads used, peak CPU usage, peak memory usage, amount of outgoing network traffic, amount of incoming network traffic, etc. In FIG. 3, the units for CPU_AVG 326 may be a percentage of total processing power consumed, and the units for memory 328 may be the number of megabytes of memory used. CPU_AVG 326 may also indicate the number of processors or processor cores used. For example, a CPU_AVG indication above 100 may indicate that more than one core is being used.

In some examples, duration 330 indicates the amount of time that the container has been running on the system. In some examples, duration 330 may indicate the amount of time that the container has been running continuously. Duration 330 may also indicate the amount of time that the container has been running over a period of time, such as over the past week, month, quarter, etc. Duration 330 may also indicate the cumulative amount of time that the container has been running throughout its lifetime on the system. Duration 330 may be measured by any measure of time, such as seconds, minutes, hours, days, years, etc., as may be appropriate.

Class 332 indicates the classification of the container. As shown in FIG. 3, the container classifications include a suspicious class, a malicious class, and a normal class. However, as earlier described, class 332 may include other classes and descriptions as well. Also as earlier described, the classifications (suspicious, malicious, normal, etc.) may result from the analysis performed by the machine-learning function. Thus, as more analysis is performed by the machine-learning function, the classifications may change.

In some examples where multiple images are run within a single container, the metadata and resource consumption of the container may be broken down to show the metadata and resource consumption of each of the running images. Each image may in turn be classified and receive an intermediate classification, and an overall container classification may be determined for the container, for example, by a cumulative points system or by the lowest received classification of an image running within that container.

FIG. 4 is an organizational diagram of a machine-learning function 412 and a decision tree 416 for the intelligent garbage collection of containers, in accordance with various examples of the present disclosure.

As suggested by FIG. 4, one example of a machine-learning function 412 may be a decision tree function. The decision tree function may be diagrammatically represented by a decision tree 416 shown in FIG. 4. In decision tree 416, the attributes are CPU_AVG 426, memory 428.1 and 428.2, and duration 430. CPU_AVG 426 may be a processing load imposed by a container on one or more hardware processors, memory 428.1 and 428.2 may be an amount of memory consumed by the container, and duration 430 may be the total amount of time that the container has been running in the past week. In some examples, more or less attributes may be included in the decision tree.

In decision tree 416, CPU_AVG 426 has been selected as the attribute for the root node, which selection may have been the result of one or more of the selection techniques earlier described. Accordingly, the containers may be classified according to whether they impose a low processing load or a high processing load. The cut-off for what is considered to be a low or a high processing load may be determined by the function using one or more of the techniques earlier described. In some examples, the decision tree includes more or less than the two CPU_AVG 426 classes (426L and 426H) shown in FIG. 4. As described earlier, the determination as to the optimal number of such classes may be made by the function.

As a result of the first classification, one or more containers may be classified into the low processing load branch, 426L. Similarly, one or more containers may be classified into the high processing load branch, 426H. However, notice that for the containers in the low processing load branch 426L, the attribute used in the decision node for the next classification is duration 430, but for the containers in the high processing load branch 426H, the attribute used is memory 428.1. This may be because one or more of the earlier described techniques may have been used by the function or the system to determine that selecting duration 430 as the decision node attribute in the low processing load branch 426L would result in the most accurate prediction for the low processing load branch 426L, while selecting memory 428.1 as the decision node attribute in the high processing load branch 426H would result in the most accurate prediction for the high processing load branch 426H.

The containers in the low processing load branch 426L may undergo a second categorization according to duration 430. Specifically, the containers may be classified according to a low duration, 430L, or a high duration, 430H. Based on these analyses and intermediate classifications, the function may finally categorize a container as normal. For example, containers that have both a low processing load and a low duration may be classified into the normal container class 434.

On the other hand, if a container has a low processing load but a high duration, the container may undergo a third classification according to the attribute at a second decision node, such as memory 428.2. Again, the container may be classified into a low memory consumption category, 428.2L, or a high memory consumption category, 428.2H. Based on these analyses and categorizations, the function may perform a final categorization resulting in a container being classified as, for example, suspicious or malicious. Thus, a container which imposes a low processor load, runs for a high duration, but consumes a low amount of memory, may be classified into the suspicious container class, 436.2L, while a container which imposes a low processor load, runs for a high duration, but consumes a high amount of memory, may be classified into the malicious container class, 438.2H.

Similar classifications may be applied to the containers in the high processing load branch 426H. In FIG. 4, the attribute for the next decision node is memory 428.1. Thus, the container may be classified according to whether it consumes a low amount of memory, 428.1L, or a high amount of memory, 428.1H. Based on these analyses and intermediate classifications, the function may finally categorize a container as suspicious or malicious. Thus, a container which imposes a high processor load and consumes a low amount of memory may be classified into the suspicious container class, 436.1L, while a container which imposes a high processor load and consumes a high amount of memory may be classified into the malicious container class, 438.1H.

Figure 5:
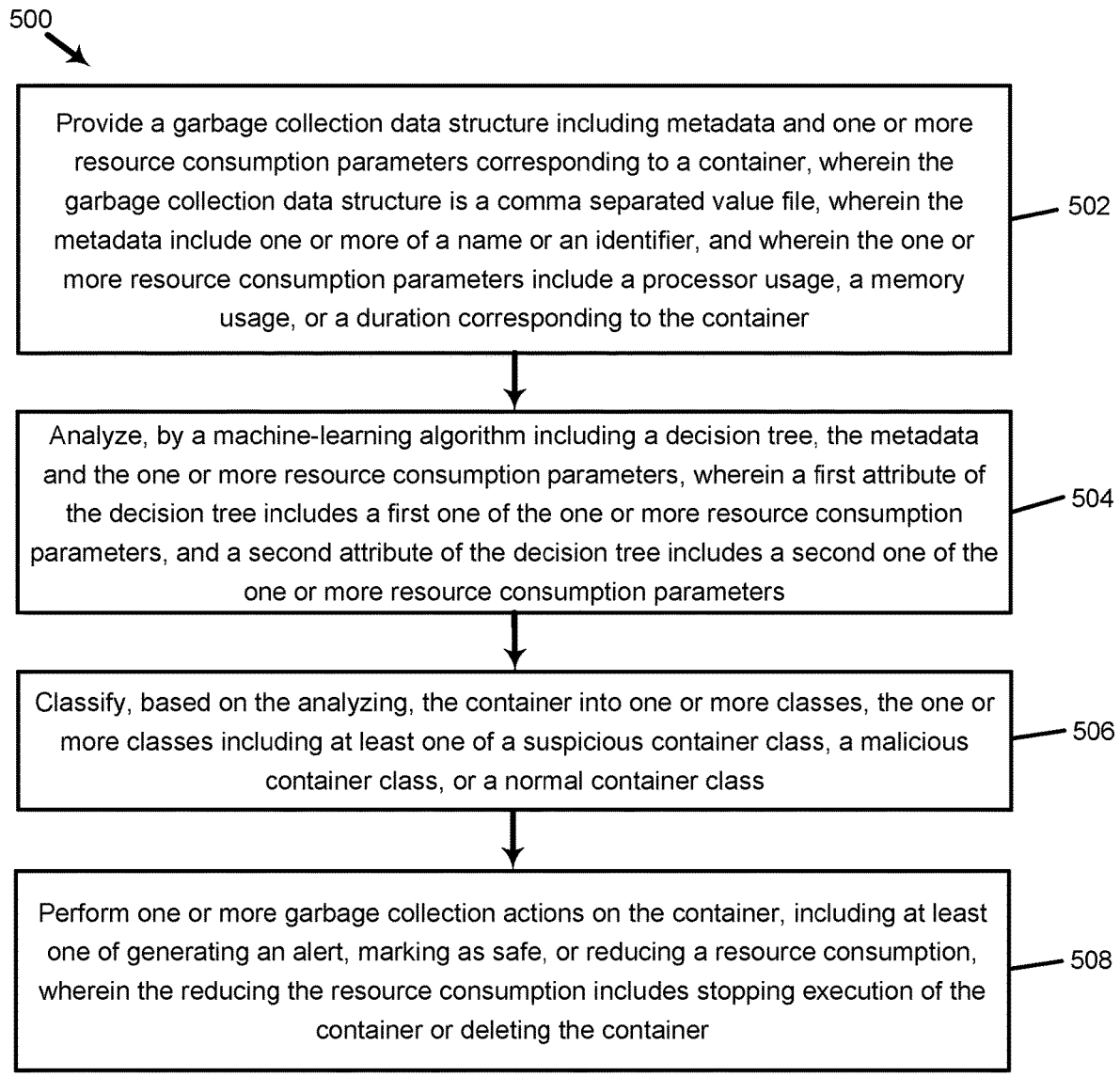
FIG. 5 is a flow diagram illustrating a method for the intelligent garbage collection of containers, in accordance with various examples of the present disclosure.

FIG. 5 is a flow diagram of a method 500 for the intelligent garbage collection of containers, in accordance with various examples of the present disclosure. In some examples, the method is performed by executing computer-readable instructions that are stored in a non-transitory memory using one or more processors. The non-transitory memory and processors may be provided by, for example, the hardware described with respect to FIG. 1. The method 500 may be performed by the one or more hardware processors 104 that are described in further detail with respect to FIG. 1. Additional steps may be provided before, during, and after the steps of method 500, and some of the steps described may be replaced, eliminated and/or re-ordered for other examples of the method 500. For example, prior to the steps of method 500, a user may select a garbage collection function from a collection of such functions to be used for the ensuing analysis. Method 500 may also include additional steps, such as verifying that the chosen function resulted in the most accurate prediction. Based on the result of the verification, the system may generate recommendations to the user to further improve container storage efficiency. Method 500 may also be performed, for example, in combination with the steps of method 200 described with respect to FIG. 2. Method 500 may also be performed using a garbage collection data structure 306 described with respect to FIG. 3. Method 500 may also be performed using a machine-learning function 412 described with respect to FIG. 4. In some examples, method 500 may be performed by one or more systems 100 described with respect to FIG. 1, acting in concert or individually.

At action 502, a garbage collection data structure is provided. The garbage collection data structure may include metadata and one or more resource consumption parameters corresponding to a container. In some examples, the garbage collection data structure may be a comma separated value (.csv) file. In some examples, the metadata include one or more of an container name or a container identifier. In some examples, the one or more resource consumption parameters corresponding to the container include a processor usage, a memory usage, or a duration of the container.

At action 504, a machine-learning function performs an analysis of the one or more resource consumption parameters corresponding to the container using one or more functions including a decision tree. In some examples, a decision tree function is used. In some examples, a first attribute of the decision tree includes a first one of the one or more resource consumption parameters (e.g., CPU_AVG), and a second attribute of the decision tree includes a second one of the one or more resource consumption parameters (e.g., duration).

At action 506, the corresponding container is classified into one or more classes. In some examples, the one or more classes may include a suspicious container class, a malicious container class, or a normal container class. In some examples, the container must be classified into at least one of these classes (although they may also be classified into other classes, such as "unclassified" or "quarantine"). In some examples, the classification is recorded in a field of the data structure.

At action 508, one or more garbage collection actions are performed on the corresponding container. In some examples, the actions include generating an alert, such as a warning prompt on a display or a warning comment in the data structure. In other examples, the actions include reducing a resource consumption, such as stopping execution of the container or deleting the container. In further examples, the actions include taking no action. In some examples, the actions include at least one of the abovementioned actions of generating an alert, reducing a resource consumption by stopping execution of the container, deleting the container, or making the container as safe.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method for performing garbage collection comprising:
providing a garbage collection data structure, the garbage collection data structure including metadata and one or more resource consumption parameters corresponding to a container being executed on a host machine;
analyzing, by a machine-learning function, the metadata and the one or more resource consumption parameters;
classifying, based on the analyzing, the container into one or more classes, the one or more classes including at least one of a suspicious container class, a malicious container class, or a normal container class; and
performing, based on the classifying, one or more garbage collection actions on the container, including at least one of generating an alert corresponding to the container, reducing a resource consumption of the container, or marking the container as safe.

2. The method of claim 1, wherein the machine-learning function includes a decision tree, and wherein a first attribute of the decision tree includes a first one of the one or more resource consumption parameters, and a second attribute of the decision tree includes a second one of the one or more resource consumption parameters.

3. The method of claim 1, wherein the one or more garbage collection actions for reducing the resource consumption of the container includes stopping execution of the container.

4. The method of claim 1, wherein the one or more garbage collection actions for reducing the resource consumption of the container includes deleting the container.

5. The method of claim 1, wherein the one or more resource consumption parameters include a processor usage, a memory usage, or a duration corresponding to the container.

6. The method of claim 1, wherein the metadata include one or more of name or an identifier.

7. The method of claim 1, wherein the garbage collection data structure includes a comma separated value file.

8. A non-transitory machine-readable medium having stored thereon machine-readable instructions executable to cause at least one machine to perform operations comprising:
providing a garbage collection data structure, the garbage collection data structure including metadata and one or more resource consumption parameters corresponding to a container being executed on a host machine;
analyzing, by a machine-learning function, the one or more resource consumption parameters;
classifying, based on the analyzing, the container into one or more classes, the one or more classes including at least one of a suspicious container class, a malicious container class, or a normal container class; and
performing, based on the analyzing, one or more garbage collection actions on the container, including at least one of generating an alert corresponding to the container, reducing a resource consumption of the container, or marking the container as safe.

9. The non-transitory machine-readable medium of claim 8, wherein the machine-learning function includes a decision tree, and wherein a first attribute of the decision tree includes a first one of the one or more resource consumption parameters, and a second attribute of the decision tree includes a second one of the one or more resource consumption parameters.

10. The non-transitory machine-readable medium of claim 8, wherein the one or more garbage collection actions for reducing the resource consumption of the container includes stopping execution of the container.

11. The non-transitory machine-readable medium of claim 8, wherein the one or more garbage collection actions for reducing the resource consumption of the container includes deleting the container.

12. The non-transitory machine-readable medium of claim 8, wherein the one or more resource consumption parameters include a processor usage, a memory usage, or a duration corresponding to the container.

13. The non-transitory machine-readable medium of claim 8, wherein the metadata include one or more of a name or an identifier.

14. The non-transitory machine-readable medium of claim 8, wherein the garbage collection data structure includes a comma separated value file.

15. A system comprising:
a non-transitory memory; and
one or more hardware processors coupled to the non-transitory memory to execute instructions from the non-transitory memory to perform operations comprising:
providing a garbage collection data structure, the garbage collection data structure including metadata and a resource consumption parameter corresponding to a container being executed on a host machine;
analyzing, by a machine-learning function, the metadata and the resource consumption parameter;
based on the analyzing, assigning a class to the container; and
based on the assigning, performing a garbage collection action on the container.

16. The system of claim 15, wherein the machine-learning function includes a decision tree, and wherein a first attribute of the decision tree includes the resource consumption parameter, and a second attribute of the decision tree includes another of the resource consumption parameter.

17. The system of claim 15, wherein the garbage collection action includes generating an alert corresponding to the container, reducing a resource consumption of the container, or marking the container as safe.

18. The system of claim 15, further comprising discretizing, by the machine-learning function, the resource consumption parameter.

19. The system of claim 15, further comprising determining, based on the analyzing, that a new class should be created for the container image, and creating the new class.

20. The system of claim 15, wherein the analyzing includes a comparison of the assigning the container class using different machine-learning functions and selecting a most accurate machine-learning function from among the different machine-learning functions.

* * * * *